Figure 1:
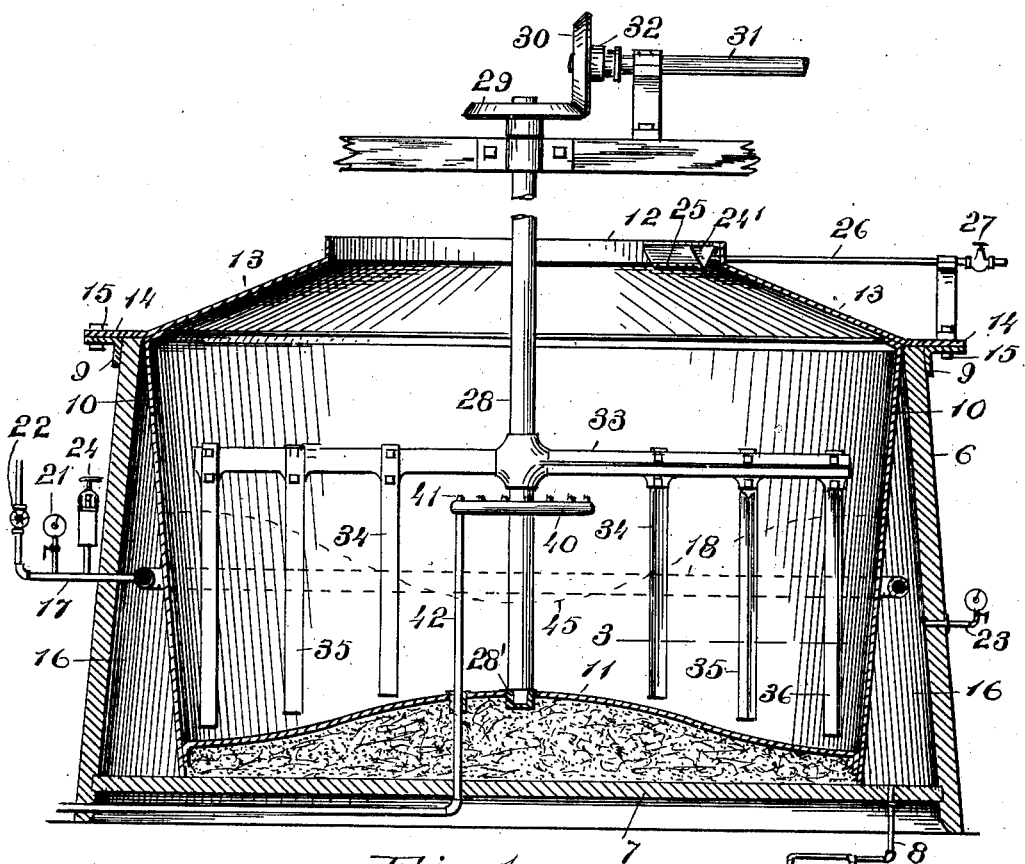

No. 737,583. PATENTED SEPT. 1, 1903.
J. J. COFFEY.
EVAPORATOR.
APPLICATION FILED JAN. 17, 1903.
NO MODEL.

Witnesses: Inventor:
J. J. Coffey,
By
Att'ys

THE NORRIS PETERS CO., PHOTO-LITHO., WASHINGTON, D. C.

No. 737,583. Patented September 1, 1903.

UNITED STATES PATENT OFFICE.

JOHN J. COFFEY, OF NEW YORK, N. Y., ASSIGNOR TO THE CHAPIN CONSTRUCTION COMPANY, OF BROOKLYN, NEW YORK, A CORPORATION OF NEW YORK.

EVAPORATOR.

SPECIFICATION forming part of Letters Patent No. 737,583, dated September 1, 1903.

Application filed January 17, 1903. Serial No. 139,490. (No model.)

*To all whom it may concern:*

Be it known that I, JOHN J. COFFEY, a citizen of the United States, residing at New York, borough of Brooklyn, in the county of Kings and State of New York, have invented a certain new and useful Improvement in Evaporators, of which the following is a specification.

The object of my invention is to provide a simple and efficient evaporator, and it is particularly applicable to the evaporation of liquids such as are liable to burn or are injured by excessive heat during the process; and to this end the invention comprises one cylindrical shell within another, having between a space to receive steam. The inner shell has a contracted upper end and is provided with a convex bottom, the interstice between this bottom and the floor of the outer shell being packed with asbestos or similar material, which while being an absorbent of moisture and having a capacity in a limited measure of retaining the heat of the steam will not impart a sufficient amount of heat to the liquid within the shell as to allow the same to become scorched or burned. The interior shell has a rotary stirring-head so constructed as to impart a vertical movement to the liquid and at the same time act as a mixer, the action of this stirrer being such that the liquid in moving around within the shell will creep up the side wall of the shell, constantly presenting new layers of the liquid to the heated surface and being thus moved around the wall so rapidly allows of a greater degree of heat being used without scorching or burning the liquid. This results in evaporating the liquid more rapidly, and the quicker this can be done the heavier will be the condensation in proportion to the loss in evaporation.

I also provide a series of nipples centrally within the shell, at a point above the surface of the liquid, through which hot air is forced, thereby setting up a current of air toward the opening of the shell and by means of which the vapor generated is expelled as rapidly as it is formed, thus greatly facilitating the evaporating process, all of which will now be set forth in detail.

Figure 2:
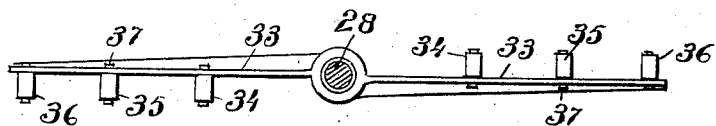
Figure 3:
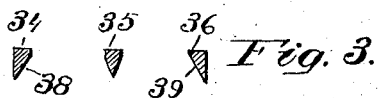
Figures 4, 5:
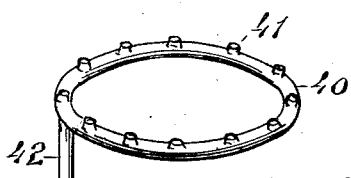

In the drawings, Figure 1 is a central vertical section of my improved evaporator; Fig. 2, top view of the stirrer; Fig. 3, horizontal section through line 3 of Fig. 1; Fig. 4, perspective view of the pipe which discharges heated air into the interior shell; and Fig. 5, section of the steam-injecting pipe, showing the perforations therein.

In constructing my invention I provide an exterior shell or casing 5, preferably of wood, having a contracted top, as shown, the base 7 thereof being at a suitable distance from the floor. At one side in the base is a drain-pipe 8, which connects with a suitable trap, whereby condensation may be drawn from the casing. The upper end of the casing has an annular flange 9. Within this casing I place a metallic shell or cylinder 10, the side of which is slightly tapering and the lower end thereof resting on the bottom 7 of the casing 6. This interior shell or cylinder has a bottom 11 centrally raised or convex in form, and between this convex portion and the floor of the outer casing I place asbestos or other suitable material, the object being to provide a substance in contact with the base which will absorb moisture from the surrounding steam and at the same time impart heat to the base, but which will at the same time prevent direct impact of the steam against the base-plate 11. A concentric opening is formed at the top of this cylinder by means of the annular flange 12, from which a sloping top 13 extends to the rim of the cylinder, and a rim 14 is produced, which rests upon the annular flange 9 and is bolted thereto, as shown at 15, the object being to provide a steam-tight space in the area 16 between cylinder and exterior casing.

Steam is admitted to the space 16 by means of a pipe 17, which enters at one side and connects with a circularly-formed pipe 18, surrounding the cylinder. This pipe 18 is perforated at intervals, as shown at 19, so that steam will be equally distributed around the cylinder.

For safety in operation and to enable one to note the heat supplied to the cylinder a pressure-gage 21 is located in the pipe 17 between the perforated pipe 18 and the inlet-valve 22, and a similar pressure-gage is also attached to a pipe 23, which enters the casing on the opposite side. I employ a pop-valve 24 between the perforated pipe 18 and the gage 21, so as to prevent excessive pressure in the steam-space.

At the upper end of the cylinder is the liquid-supply apparatus, which in this instance is constructed in the form of a V-shaped trough 24, having perforations 25 at its lowest point, through which the liquid can trickle, the feed being proportioned to the speed of the evaporation. A pipe 26, having therein a valve 27, serves to supply liquid to the cylinder as rapidly as desired. I find that with certain liquids the most efficient work is done at certain temperatures, provided the feed is constant; but if the feed is not regular or exceeds or falls short of a certain supply evaporation is in a measure arrested or the liquid evaporated is tainted or deteriorated.

A vertical shaft 28 is mounted in a socket 28' of the bottom 11, its upper end being provided with a friction-wheel 29, engaging with a friction-wheel 30 on the horizontal driving-shaft 31, and a clutch 32 or similar means may be employed to make the friction-wheels coöperate. This vertical shaft has a pair of cross-arms 33 projecting out therefrom within the cylinder, each arm having three downwardly-projecting fingers 34 35 36, held in position by means of bolts 37. It will be observed that the inner finger 34 has its outer forward edge chamfered away, as at 38, and the outer finger 36 has its inner forward edge 39 chamfered. The intermediate finger 35 has both forward corners chamfered, so as to provide a knife-edge. The object of this is to cause the inner and the outer fingers to throw the liquid together and break it up into small particles, allowing evaporation to begin so much earlier and proceed more rapidly than otherwise.

For the purpose of freeing the interior of the cylinder as rapidly as possible of the accumulation of vapor I provide a pipe 40 with upwardly-projecting nipples 41, and this is located around the vertical shaft directly below the arms of the stirrer, said pipe being held in its elevated position by means of the vertical feed-pipe 42, this latter pipe passing through the base of the cylinder and the bottom of the casing and extending thence horizontally to a blower, (not shown,) whereby heated air may be forced through the pipe and nipples and by this means set up a draft which will expel the vapor through the opening in the top of the cylinder. This also causes all bad odors or deleterious defects in the liquid to pass off and leave the finished product purified.

The operation is as follows: Liquid is supplied to the interior cylinder 10 through the pipe 26 and feeding apparatus 24', and the shaft 28, containing the stirrer, is rotated, the rate of movement depending largely upon the character of liquids to be treated. The rotary movement of the stirrer causes a vertical motion in the liquid, which in time will induce the liquid to mount the sides of the cylinder and be depressed centrally, as shown by the dotted line 45 in Fig. 1. As the liquid moves around the cylinder a large portion has skin contact against the side wall 10, and as steam is injected into the surrounding space 16 evaporation will take place within the cylinder 10, and the same will be more rapid than if the liquid were in a quiescent state.

In apparatus of this class it is desirable that the vapor from the liquid be withdrawn as rapidly as possible, and to this end the hot-air pipe supplies a constant volume of heated air under pressure, the action of which is to blow out the vapor and to thus free the cylinder more expeditiously than could be done otherwise and greatly facilitate evaporation.

I find in the use of apparatus of this class that where certain liquids remain in a quiescent state against a heated surface there is a tendency for a film or coating to form which prevents the body of the liquid from coming into contact with the surface, and in time this coagulated portion will burn or scorch, and thus affect the entire mass within the cylinder. This is particularly true where a vertical motion is imparted to the liquid at the bottom in the central portion of the revolving mass, and to obviate this I fill the space between the base of the cylinder and the bottom of the casing with asbestos or other similar absorbent material, which will in course of time be heated up, but never in any case above 160° or 170° temperature.

I also call particular attention to the convex base of the cylinder, the object of which is to accelerate the height to which the liquid is thrown against the sides of the cylinder by centrifugal force and which forms a very important feature of the invention.

The inclined side wall of the cylinder 10 greatly facilitates the movement of the liquid upwardly as it moves around within the cylinder, and it is therefore advantageous to employ this form of construction.

What I claim as new is—

1. An evaporator comprising an exterior casing and an inner cylindrical shell diametrically larger at its upper than at its lower end having a revolving stirrer therein, the bottom of said cylinder being convexed and having absorbent material below said convexed bottom.

2. An evaporator, comprising an exterior casing and an inner cylindrical shell diametrically larger at its upper than at its lower end with a steam-space around said cylindrical shell and means for producing a vertical motion of the liquid within the cylinder, and absorbent material below the base of said cylinder and in contact therewith.

3. An evaporator comprising an exterior casing with a contracted upper end and an inner vertical cylindrical shell diametrically larger at its upper than at its lower end having a central opening at its upper end, and a stirrer on a vertical shaft within said cylinder and means within said cylinder for injecting heated air, substantially as set forth.

4. An evaporator comprising an exterior casing with a contracted upper end and an inner vertical cylindrical shell diametrically larger at its upper than at its lower end having a central opening at its upper end and a convex bottom, a vertical shaft in said cylinder having stirring-fingers and means for ejecting heated air into said cylindrical shell.

5. An evaporator comprising an exterior casing with a contracted upper end and an inner cylindrical shell, diametrically larger at its upper end than at its lower end, with steam-space surrounding said shell, a central opening at the upper end of said shell and means for supplying liquid at said opening, a convex bottom in said shell and absorbent material between the said bottom and the base of the casing and a steam-space surrounding said cylinder and means for supplying steam thereto.

6. An evaporator comprising an exterior casing the upper end of said casing being contracted, and provided with a drain and trap in the base, and means for supplying steam to said casing and distributing the same therein, in combination with an interior cylinder or shell, the lower end of which is contracted, having a central opening at its upper end and a convex base at its lower end and absorbent material beneath said convex base and a rotary stirrer within said cylinder, as set forth.

7. In an evaporator an exterior casing having a drain and trap, and means for supplying steam thereto, in combination with an interior cylindrical shell having an opening at its upper end and means for supplying liquid at said opening, the lower end of said cylinder having a convex base and absorbent material beneath the same, a vertical shaft in said cylinder having stirring-fingers actuated thereby, and means for injecting heated air into said cylinder, substantially as set forth.

In testimony whereof I affix my signature in presence of two witnesses.

JOHN J. COFFEY.

Witnesses:
HENRY WIESNER,
M. D. WATE.